United States Patent
Ghalyan et al.

(10) Patent No.: US 11,922,704 B2
(45) Date of Patent: Mar. 5, 2024

(54) SYSTEM AND METHOD FOR DETECTING ROAD AND LANE CONNECTIONS AT INTERSECTIONS

(71) Applicant: GM GLOBAL TECHNOLOGY OPERATIONS LLC, Detroit, MI (US)

(72) Inventors: Najah Ghalyan, Austin, TX (US); Kaydee Hartmann, Austin, TX (US); Sean D. Vermillion, Austin, TX (US); Mason D. Gemar, Cedar Park, TX (US); Rajesh Ayyalasomayajula, Austin, TX (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 343 days.

(21) Appl. No.: 17/551,567

(22) Filed: Dec. 15, 2021

(65) Prior Publication Data
US 2023/0186646 A1 Jun. 15, 2023

(51) Int. Cl.
*G06V 20/56* (2022.01)
*B60W 60/00* (2020.01)
(Continued)

(52) U.S. Cl.
CPC ......... *G06V 20/588* (2022.01); *B60W 60/001* (2020.02); *G01C 21/30* (2013.01);
(Continued)

(58) Field of Classification Search
CPC ........... B60W 30/0956; B60W 60/001; B60W 30/18154; B60W 30/095;
(Continued)

(56) References Cited

U.S. PATENT DOCUMENTS 10,628,671 B2 * 4/2020 Zang .................... G03B 15/006
10,971,714 B2 4/2021 Tallman et al.
(Continued)

FOREIGN PATENT DOCUMENTS

CN 112560236 A 3/2021
WO WO2020240274 A1 12/2020

OTHER PUBLICATIONS

V. Z. Patterson, F. E. Lewis and J. C. Gerdes, "Optimal Decision Making for Automated Vehicles Using Homotopy Generation and Nonlinear Model Predictive Control," 2021 IEEE Intelligent Vehicles Symposium (IV), Nagoya, Japan, 2021, pp. 1045-1050, doi: 10.1109/IV48863.2021.9575302. (Year: 2021).*
(Continued)

*Primary Examiner* — John Villecco
*Assistant Examiner* — Courtney Joan Nelson
(74) *Attorney, Agent, or Firm* — Vivacqua Crane PLLC

(57) ABSTRACT

A method for detecting road edges at a predetermined intersection, comprising: receiving, by the controller, aerial imagery data about the predetermined intersection; receiving, by the controller, vehicle telemetry data from at least one vehicle passing through the predetermined intersection; detecting, using the aerial imagery data and generative adversarial networks (GANs) executed on the controller, road edges at the predetermined intersection; classifying, using the vehicle telemetry data and a random forest classifier (RFC) executed on the controller, each vehicle trajectory passing through the predetermined intersection with a label corresponding to a unique maneuver to create a maneuver labeling at the predetermined intersection; constructing, using the maneuver labeling determined by the RFC and the road edges, a probabilistic finite state automata (PFSA) to pair inbound lanes with outbound lanes at the predetermined
(Continued)

intersection; and determining lane edges at the predetermined intersection using a homotopy model.

20 Claims, 8 Drawing Sheets

(51) Int. Cl.
   *G01C 21/30* (2006.01)
   *G06V 20/17* (2022.01)
   *G08G 1/01* (2006.01)
(52) U.S. Cl.
   CPC ........... *G06V 20/17* (2022.01); *G08G 1/0112* (2013.01); *B60W 2552/53* (2020.02)
(58) Field of Classification Search
   CPC ..... B60W 60/00274; B60W 2554/402; B60W 30/12; B60W 30/18159; B60W 2520/06; B60W 2552/53; G06V 20/588; G06V 20/56; G06V 10/82; G06V 10/764; G06V 20/597; G06V 20/54; G06V 20/10; G06V 10/26; G06V 20/17; G08G 1/167; G08G 1/0969; G08G 1/137; G08G 1/0112; G01C 21/3815; G01C 21/3658; G01C 21/3852; G01C 21/30
   See application file for complete search history.

(56) References Cited

U.S. PATENT DOCUMENTS

| | | | | |
|---|---|---|---|---|
| 11,030,457 | B2* | 6/2021 | Soni | G06F 18/2163 |
| 2019/0244400 | A1* | 8/2019 | Hamer | G01C 21/3852 |
| 2020/0109959 | A1 | 4/2020 | Wu et al. | |
| 2020/0250439 | A1 | 8/2020 | Vig | |
| 2020/0320863 | A1 | 10/2020 | Lewis et al. | |
| 2020/0341466 | A1 | 10/2020 | Pham et al. | |
| 2020/0410254 | A1 | 12/2020 | Pham et al. | |
| 2021/0166145 | A1 | 6/2021 | Omari et al. | |

OTHER PUBLICATIONS

D. Costea, A. Marcu, M. Leordeanu and E. Slusanschi, "Creating Roadmaps in Aerial Images with Generative Adversarial Networks and Smoothing-Based Optimization," 2017 IEEE International Conference on Computer Vision Workshops (ICCVW), Venice, Italy, 2017, pp. 2100-2109, doi: 10.1109/ICCVW.2017.246. (Year: 2017).*

M. Barbier, C. Laugier, O. Simonin and J. Ibañez-Guzmán, "Classification of drivers manoeuvre for road intersection crossing with synthethic and real data," 2017 IEEE Intelligent Vehicles Symposium (IV), Los Angeles, CA, USA, 2017, pp. 224-230, doi: 10.1109/IVS.2017.7995724. (Year: 2017).*

Debaditya Roy, Tetsuhiro Ishizaka, C. Krishna Mohan, and Atsushi Fukuda, "Vehicle Trajectory Prediction at Intersections Using Ineraction Based Generative Adversarial Networks", Nov. 5, 2019, 7 pages.

Manjiang Hu, Yuan Liao, Wenjun Wang, Guofa Li, Bo Cheng, and Fang Chen, "Decision Tree-Based Maneuver Prediction for Driver Rear-End Risk-Avoidance Behaviors in Cut-In Scenarios", Hindawi Journal of Advanced Transportation, vol. 2017, Article ID 7170348, 12 pages.

Aaditya Prakash Chouhan and Gourinath Banda, "Formal Verification of Heuristic Autonomous Intersection Management Using Statistical Model Checking", Sensors 202, 20, 4506; doi:10.3390/s20164506, www.mdpi.com/journal/sensors, 25 pages.

Qian Shi, Xiaoping Liu, and Xia Li, "Road Detection From Remote Sensing Images by Generative Adversarial Networks", 2017 IEEE, vol. 6, 2018, pp. 25486-25494.

* cited by examiner

Numerical Estimation of Homotopy H(s,t) Using Linear Interpolation

Numerical Estimation of Homotopy H(s,t) Using Vector Rotation

SYSTEM AND METHOD FOR DETECTING ROAD AND LANE CONNECTIONS AT INTERSECTIONS

INTRODUCTION

The present disclosure generally relates to road mapping and, more specifically, to systems and methods for detecting road and lane connections at intersections.

Some vehicles use on-vehicle modules to collect and transmit data. It is therefore useful to develop method and systems to collect data about roads that do not depend on on-vehicle modules. The presently disclosed method and system detect road and lane connections at intersection without using on-vehicle modules.

SUMMARY

Given a vehicle approaching an intersection from a specific inbound lane, the present disclosure describes a method for specifying all valid receiving outbound lanes at the intersection and the edges of the corresponding virtual lanes connecting the specific inbound lane to the valid receiving outbound lane. Moreover, the present disclosure describes a method for detecting the intersection road edges that delineates the boundary of the intersection. These road edges represent a map feature that is useful for the autonomous driving system, as well as their role for deriving other map features, such as lane edges and traffic control locations.

In an aspect of the present disclosure, a method for detecting road edges at a predetermined intersection includes: receiving, by the controller, aerial imagery data about the predetermined intersection. The "aerial imagery data about the predetermined intersection" means data from an image captured within a predetermined radius around the predetermined intersection. the controller is not necessarily in the vehicle; receiving, by the controller, vehicle telemetry data gathered within a predetermined radius around the predetermined intersection from multiple vehicles passing through the predetermined intersection; detecting, using the aerial imagery data and/or vehicle telemetry data and at least one deep learning model, such as a generative adversarial network (GAN), road edges at the predetermined intersection via a hybrid of a GAN and a sliding window algorithm executed on the controller; classifying, using machine learning classification, such as a random forest classifier (RFC), executed on the controller, the predetermined intersection with each telemetry data point labeled by a corresponding unique maneuver to create maneuver-labeled telemetry data points at the predetermined intersection; constructing, using the maneuver-labeled telemetry data points determined by the RFC and the road edges, a probabilistic finite state automata (PFSA) to pair inbound lanes with outbound lanes at the predetermined intersection; and determining lane edges at the predetermined intersection using a homotopy model.

In an aspect of the present disclosure, the method further includes determining whether the road edges detected using an image-based model, such as the GAN, are accurate.

In an aspect of the present disclosure, the road edges detected using the GAN are imagery-based road edges, and the method further includes determining, using the vehicle telemetry data and a sliding window-based model executed on the controller, telemetry-based road edges at the predetermined intersection in response to determining that the imagery-based road edges detected using the GAN are not accurate.

In an aspect of the present disclosure, the homotopy model uses a nearest neighbor analysis to detect the specific road edges to be mimicked for generating the appropriate lane edges for every maneuver at the predetermined intersection.

In an aspect of the present disclosure, the method further includes identifying allowable maneuvers using the vehicle telemetry data and labels datapoints of the vehicle telemetry data corresponding to the allowable maneuvers as path-labeled data points. This refers only to allowable maneuvers.

In an aspect of the present disclosure, the method further includes training the RFC using the path-labeled datapoints.

In an aspect of the present disclosure, the homotopy model uses linear interpolation to determine the lane edges at the predetermined intersection.

In an aspect of the present disclosure, the homotopy model uses vector rotation to detect the lane edges at the predetermined intersection.

In an aspect of the present disclosure, the method further includes controlling a host vehicle such that the host vehicle stays within the lane edges while traveling through the predetermined intersection.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

The present disclosure will be described in conjunction with the following figures, wherein like numerals denote like elements.

DETAILED DESCRIPTION

The following detailed description is merely exemplary in nature and is not intended to limit the application and uses. Furthermore, there is no intention to be bound by expressed or implied theory presented in the preceding technical field, background, brief summary or the following detailed description.

As used herein, the term "module" refers to hardware, software, firmware, electronic control component, processing logic, and/or processor device, individually or in a combination thereof, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of functional and/or logical block components and various processing steps. It should be appreciated that such block components may be realized by a number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with a number of systems, and that the systems described herein are merely exemplary embodiments of the present disclosure.

For the sake of brevity, techniques related to signal processing, data fusion, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that alternative or additional functional relationships or physical connections may be present in an embodiment of the present disclosure.

Figure 1:
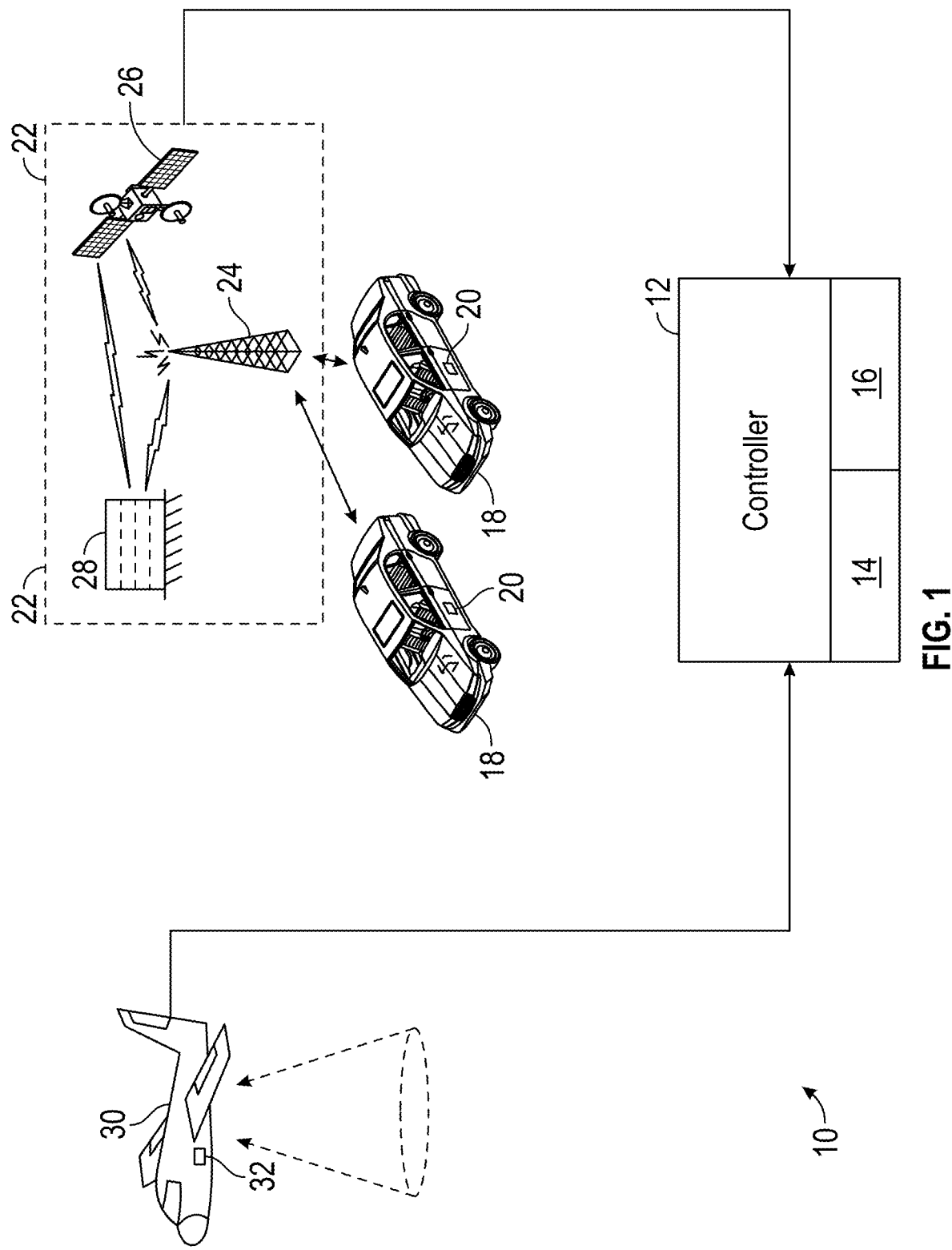
FIG. 1 is a schematic diagram of a system for gathering aerial images and vehicle telemetry data.
Figure 2:
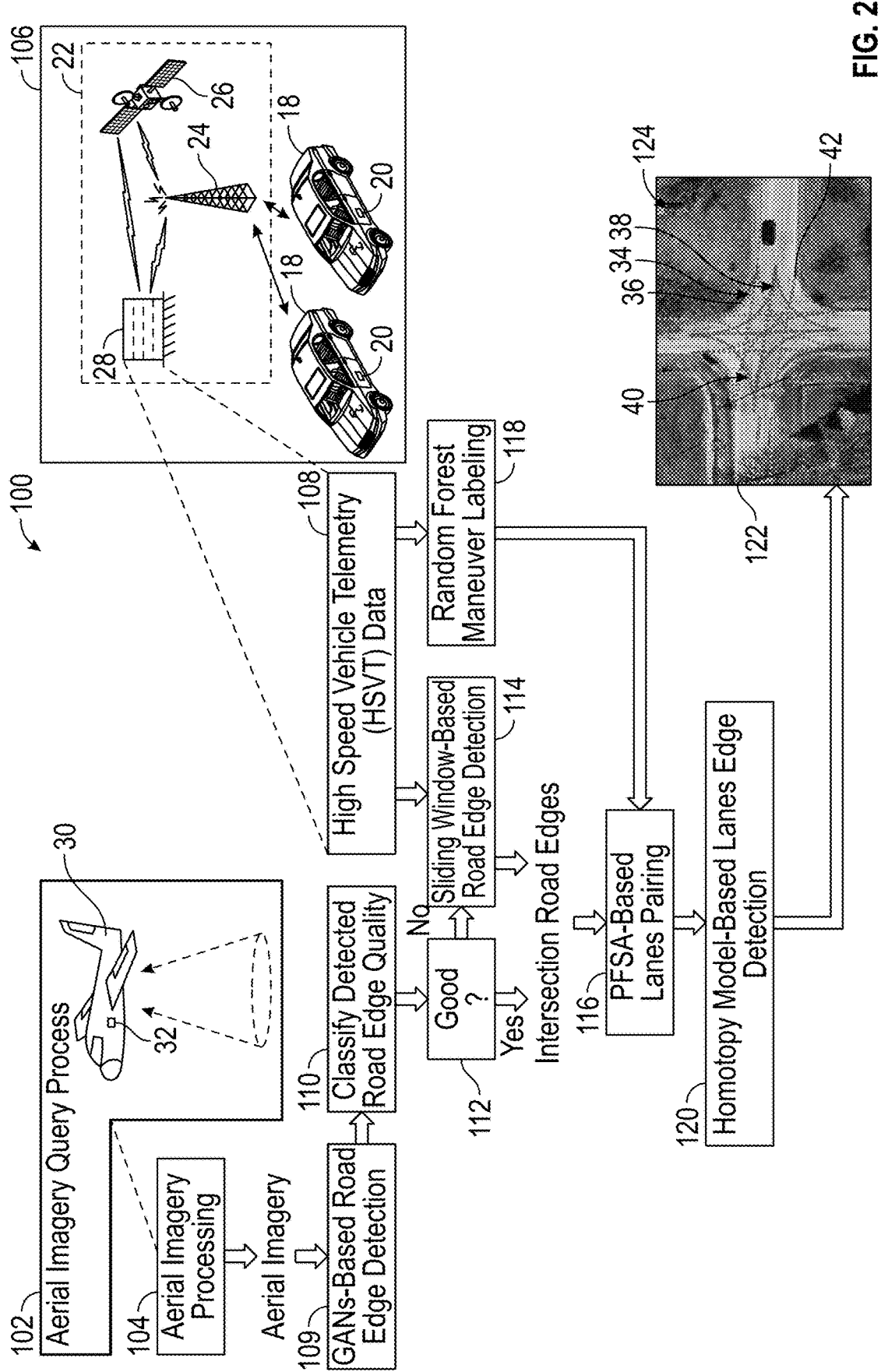
FIG. 2 is a flowchart of a method for detecting road and lane connections at an intersection.

With reference to FIG. 1, a control system 10 is configured to detect road edges at a predetermined intersection. In the depicted embodiment, the system 10 includes a controller 12. The controller 12 includes at least one processor 14 and a non-transitory computer readable storage device or media 16. The processor 14 may be a custom-made processor, a central processing unit (CPU), an auxiliary processor among several processors associated with the controller 12, a semiconductor-based microprocessor (in the form of a microchip or chip set), a macroprocessor, a combination thereof, or generally a device for executing instructions. The computer readable storage device or media 16 may include volatile and nonvolatile storage in read-only memory (ROM), random-access memory (RAM), and keep-alive memory (KAM), for example. KAM is a persistent or non-volatile memory that may be used to store various operating variables while the processor 14 is powered down. The computer-readable storage device or media 16 may be implemented using a number of memory devices such as PROMs (programmable read-only memory), EPROMs (electrically PROM), EEPROMs (electrically erasable PROM), flash memory, or another electric, magnetic, optical, or combination memory devices capable of storing data, some of which represent executable instructions, used by the controller 12. As discussed below, the controller 12 is programmed to execute the method 100 (FIG. 2).

The system 10 may further include or be in combination with one or more vehicles 18. Each vehicle 18 includes one or more vehicle sensors 20 that sense vehicle telemetry data. The vehicles 18 may be autonomous. The vehicle telemetry data of the vehicles 18 may include vehicle position (e.g., longitudinal and latitudinal coordinates), vehicle speed, vehicle heading, among other attributes. To sense the vehicle telemetry data, the vehicle sensors 20 may include, but are not limited to, lidars, speedometers, radars, Global Positioning System (GPS) transceivers, odometers, one or more cameras (e.g., optical cameras and/or thermal cameras, such as a rear camera and/or a front camera), steering angle sensor, ultrasonic sensors, one or more inertial measurement units (IMUs) and/or other sensors 20. Regardless of the kind of vehicle sensors 20 used, the vehicle telemetry data is crowdsourced data collected from the vehicles 18 at predetermined intervals (e.g., every three seconds) when the vehicle 18 is on.

The system 10 may further include or be in communication with a telecommunication system 22. The vehicle sensors 20 are therefore in communication with the controller 12 through the telecommunication systems 22. The telecommunication systems 22 may include, for example, one or more telecommunication towers 24 and/or one or more telecommunication satellites 26 to transmit the vehicle telemetry data from the vehicle 18 to a database 28. The database 28 may be part of the telecommunication system 22 and is in communication with the controller 12. As such, the vehicle telemetry data may be transmitted from the vehicles 18 to the controller 12 through the telecommunication system 22.

The system 10 may further include or be in communication with an aerial device 30, such as an aircraft, a helicopter, an unmanned aerial vehicle (UAV), a balloon, a satellite, among others. The aerial device 30 includes one or more image sensor 32, such as a camera, configured to collect aerial imagery of a road intersection. The aerial imagery is then transformed into aerial imagery data. Because the aerial device 30 is in communication with the controller 12, the aerial imagery data may be transmitted from the aerial device 30 to the controller 12.

FIG. 2 is a flowchart of a method 100 for detecting road edges at a predetermined intersection 34. The method 100 begins at block 102. At block 102, the image sensor 32 collets aerial imagery data from the predetermined intersection 34. As discussed above, the image sensor 32 may be a camera and is mounted in an aerial device 30, such as an aircraft. To collect the aerial imagery data, the image sensor 32 captures images of the predetermined intersection 34. After collecting the aerial imagery data, the method 100 proceeds to block 104. At block 104, the controller 12 receives and processes the aerial imagery data.

The method 100 also includes block 106. At block 106, the vehicle sensors 20 collect telemetry data about the vehicles 18 passing through the predetermined intersection 34. As discussed above, the telemetry data of the vehicles 18 may include vehicle position (e.g., longitudinal and latitudinal coordinates), vehicle speed, vehicle heading, among other attributes. Further, the telemetry data is crowdsourced from the vehicles 18 at predetermined intervals (e.g., every three seconds) when the vehicle 18 is on. After collecting the telemetry data, the method 100 proceeds to block 108. At block 108, the controller 12 receives and processes the telemetry data from at least one of the vehicles 18 passing through the predetermined intersection 34.

The method 100 further includes block 109. At block 109, the controller 12 uses the aerial imagery data to detect road edges at the predetermined intersection 34. The road edges 36 that are detected using the aerial imagery data may be referred to as imagery-based road edges. To detect the road edges using the aerial imagery data, the controller 12 may execute generative adversarial networks (GANs). After detecting road edges 36 at the predetermined intersection 34, the method 100 proceeds to block 110.

At block 110, the controller 12 determines whether the road edges 36 detected using the GAN are accurate. To do so, controller 12 may execute an image classifier, such as a convolutional neural network (CNN) classifier. At block 110, the controller 12 may use the CNN classifier to determine whether the road edges 36 detected using the GAN are accurate. The method 100 then proceeds to decision block 112.

At decision block 112, the method 100 proceeds to block 114 if and only if the CNN classifier determines that the road edges detected using the GAN are not accurate. On the other hand, the method 100 proceeds to block 116 if and only if the road edges 36 detected using the GAN are accurate.

At block 114, the controller 12 executes a sliding window-based algorithm using the vehicle telemetry data to detect the road edges 36 at the predetermined intersection 34. The road edges 36 that are detected using the vehicle telemetry data may be referred to as telemetry-based road edges.

The method 100 also includes block 118. At block 118, the controller 12 classifies each vehicle trajectory of the vehicles 20 passing through the predetermined intersection 34 with a label corresponding to a unique maneuver to create a maneuver labeling at the predetermined intersection 34. To do so, the controller 12 executes a random forest classifier (RFC) using the vehicle telemetry data. Then, the method 100 proceeds to block 116.

At block 116, the controller 12 uses the maneuver labeling determined by the RFC and the road edges to construct a probabilistic finite state automata (PFSA). The PFSA is used to pair inbound lanes 38 with outbound lanes 40 at the predetermined intersection 34. After block 116, the method 100 proceeds to block 120.

At block 120, the controller 12 executes a homotopy model using the paired inbound lanes 38 and outbound lanes 40 to detect the lane edges 42. The homotopy model may use the nearest neighbor search (NNS) to detect the appropriate "homotopic" road edge. Then, the detected homotopic road edge is mimicked to generate the desired lane edge. Once the controller 12 determines the lane edges 42, the method 100 proceeds to block 122.

At block 122, the controller 12 constructs a feature map 124 based on the lane edges 42, the road edges 36, and the paired the inbound lanes 38 and outbound lanes 40. Also at block 122, the controller 12 or another controller may command (or provide the vehicle 18 with sufficient information to command or control) the movement of one or more vehicles 18 through the predetermined intersection 34. The feature map 124 may also be used to derive other map features, such as traffic control locations. Further, at block 122, the controller 12 may autonomously control one of the vehicle 18 (i.e., a host vehicle) using the lane edges detected by the homotopy model.

Figure 3:
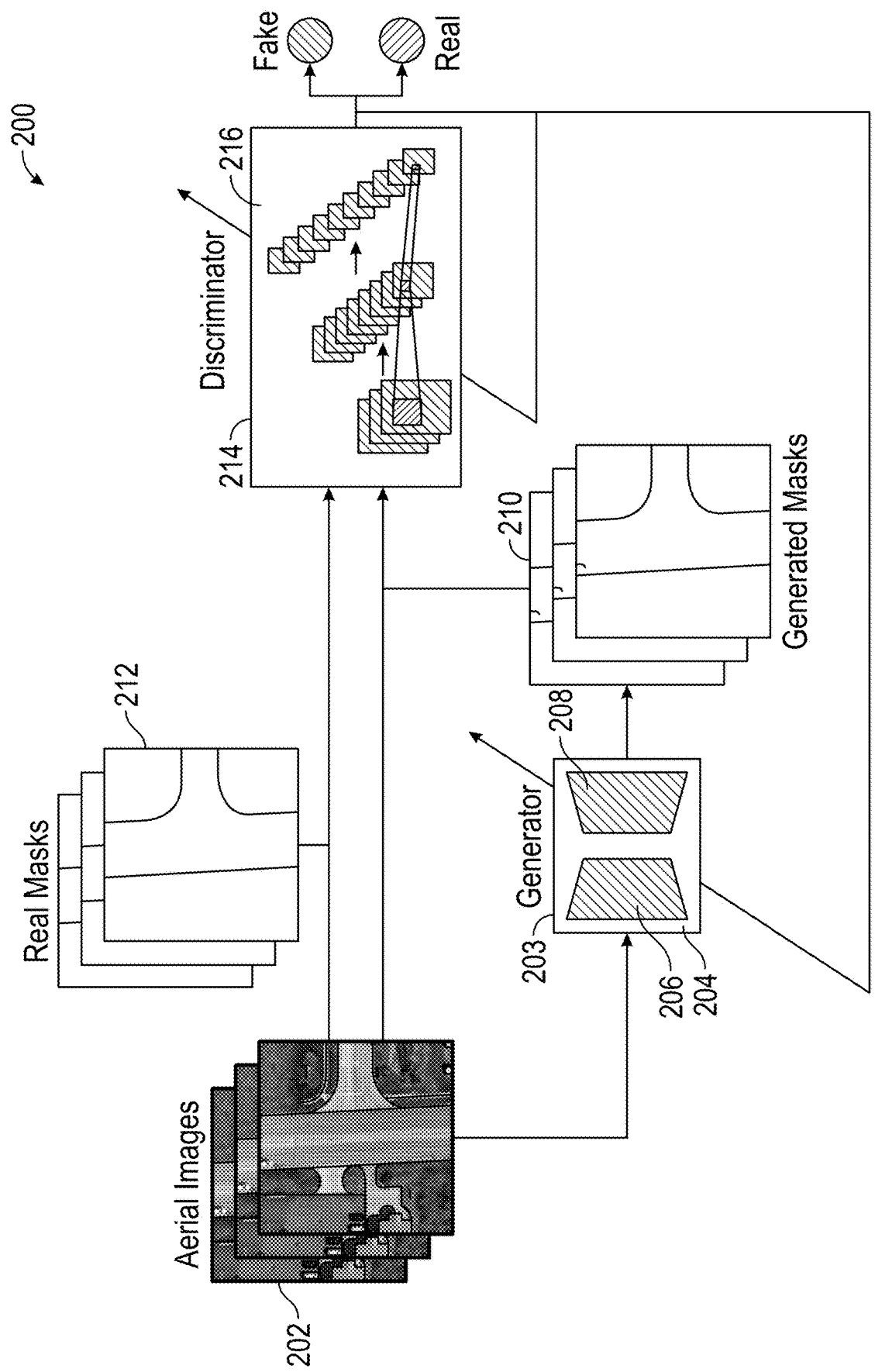
FIG. 3 is a flowchart of a method of detecting road using GANs, which is part of the method of FIG. 2.

FIG. 3 is a flowchart of a method 200 of detecting road edges 36 using GANs, which corresponds to block 109 of FIG. 2. In this method 200, the controller 12 uses the aerial imagery data to detect road edges 36 at the predetermined intersection 34. The method 200 begins at block 202. At block 202, the controller 12 inputs the aerial images to the GAN. Then, the method 200 proceeds to block 203.

At block 203, a generator network 204 processes the aerial images. The GAN includes the generator network 204. The generator network 204 includes an encoder 206 and a decoder 208. The encoder 206 encodes the content of the aerial images and generates the features of the aerial images. The decoder 208 decodes the features of the aerial images and generates the generated masks. The encoder 206 may have a plurality of encoder layers, and the decoder 208 may have a plurality of decoder layers. Each encoder layer performs convolution with a filter bank to produce a set of feature maps. The decoder 208 receives the feature maps from the encoder 206 and produces generated masks. The method 200 then proceeds to block 210. At block 210, the controller 12 stores the generated masks generated by the generator network 204.

The method 200 also includes block 212. At block 212, the controller 12 receives and handles the aerial images to produce real masks. The controller 12 then stores the real masks. The method 200 then proceeds to block 214. At block 214, the controller 12 inputs the real masks and the generated masks into a discriminator network 216. The discriminator network 216 is part of the GAN and compares the generated masks generated by the generator network 204 with the real masks to determine whether generated masks are real or fake. During training of the GAN, the discriminator network 216 learns to distinguish between the generated masks generated by the generator network 204 from the real masks.

Figure 4:
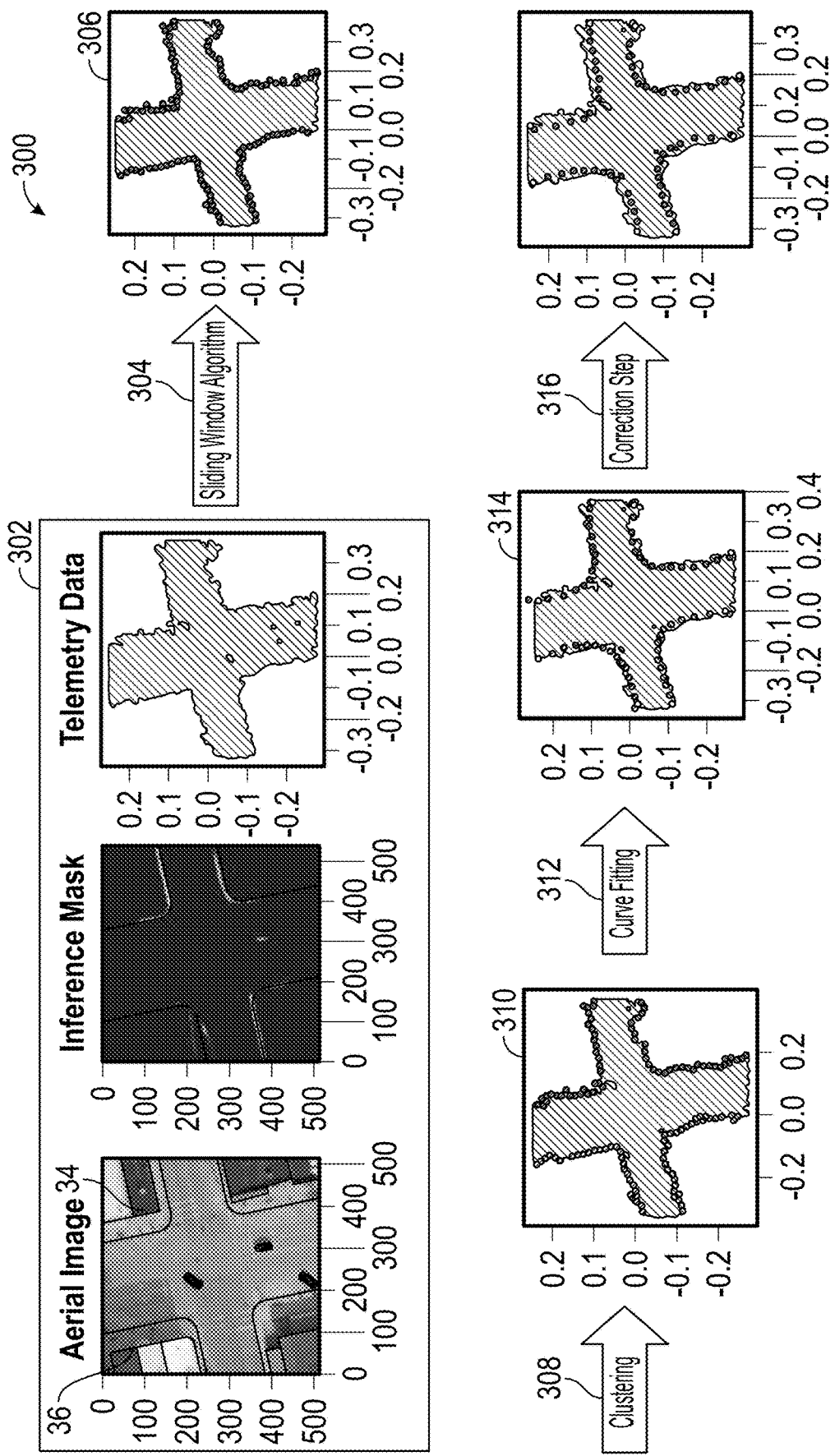
FIG. 4 is a flowchart of a method for detecting road edges using telemetry data, which is part of the method of FIG. 2.

FIG. 4 is a flowchart of a method 300 for detecting road edges using telemetry data, which correspond to block 114 of FIG. 2. The method 300 begins at block 302. At block 302, the controller 12 uses the aerial images (i.e., the aerial imagery data) to generate an interference mask of the predetermined intersection 34. If the generated road edges are poor, they are augmented with the vehicle telemetry data at the predetermined intersection and enhanced road edges are regenerated using a sliding-window-based algorithm that leverages the combination of the image-based (poor) road edges' points and the vehicle telemetry data points. Also, the controller 12 stores the telemetry data received from the vehicles 18 passing through the predetermined intersection 34. Then, the method 300 continues to block 304.

At block 304, the controller 12 executes a sliding window algorithm using the telemetry data to detect candidate road edges 36 at the predetermined intersection 34. In the sliding window algorithm, the telemetry data points are augmented with the—possibly poor—road edge points generated by the image-based model. Then, a rectangular window of fixed width and height "slides" horizontally and vertically across these points. Those points contained in the sliding window when the window's state changes from empty to non-empty—or opposite—are flagged, as shown in block 306. The method 300 then proceeds to block 308.

At block 308, the controller 12 executes a clustering operation to cluster the datapoints, flagged in block 304, corresponding to the initial road edges 36 of the predetermined intersection 34. The output clusters are shown in block 310. Then, the method 300 proceeds to block 312.

At block 312, the controller 12 executes a curve fitting operation. Specifically, a curve is fitted on each cluster of datapoints, generating road edge candidates for the predetermined intersection 34. The output of the curve fitting operation is shown in block 314. The method 300 then proceeds to block 316.

At block 316, the controller 12 executes a correction operation. The correction operation is a slight deformation performed on the curve-fitted road edge candidate—obtained from the curve fitting step—to ensure that the generated road edge is aligned with the upstream and downstream inbound and outbound legs, respectively, ensuring both continuity and smoothness.

Figure 5:
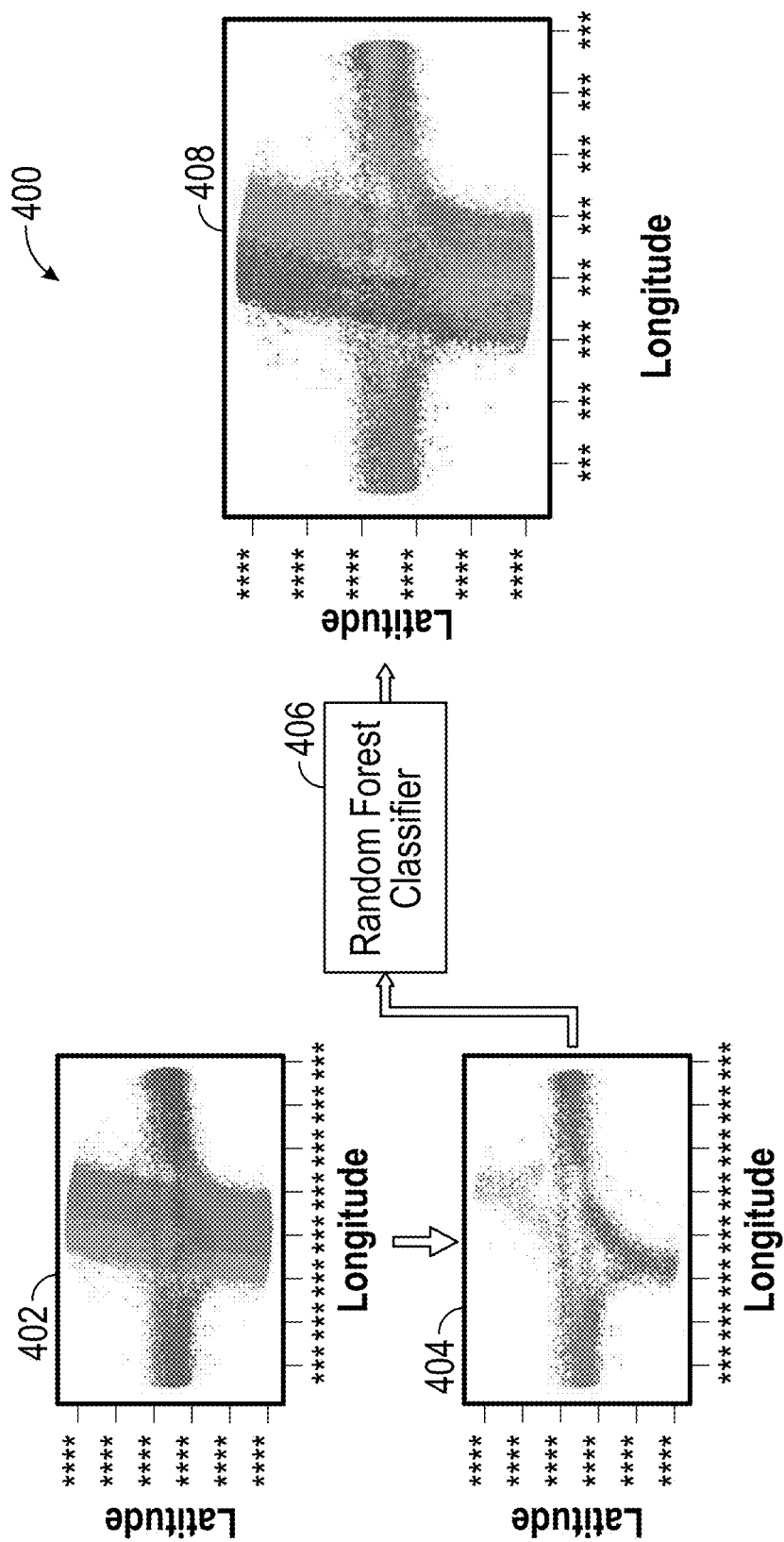
FIG. 5 is a flowchart of a method for maneuver labeling, which is part of the method of FIG. 2.

FIG. 5 is a flowchart of a method 400 for maneuver labeling, which corresponds to block 118 of FIG. 2. The method 400 begins at block 402. At block 402, the controller 12 gathers map-matched telemetry data (using sensors 20) within a predetermined radius around the predetermined intersection 34 (FIG. 2). Then, the method 400 proceeds to block 404. At block 404, the controller 12 scans each VIX to identify changes in road segments that the vehicle 18 is matched to. The VIX is an identification number that identifies a vehicle 18 for any given interval between on and off operations. That is, when the vehicle 18 is off, it will be assigned a new VIX after it is turned on again. If the label change corresponds to an allowable maneuver listed in the Road Network Topology (RNT) path table, label all points in VIX with the corresponding path information. The method 400 then proceeds to block 406.

At block 406, the controller 12 trains an RFC with the path-labeled VIXs to infer the path of any remaining, unlabeled VIXs. Features used in the classification are the VIX's first and last latitudes, longitudes, and heading direction unit vector. The training may be supplemented with synthetic data generated from road segments in each path. The method 400 then proceeds to block 408. At block 408, the controller 12 outputs the maneuver labeling generated by the RFC.

Figure 6:
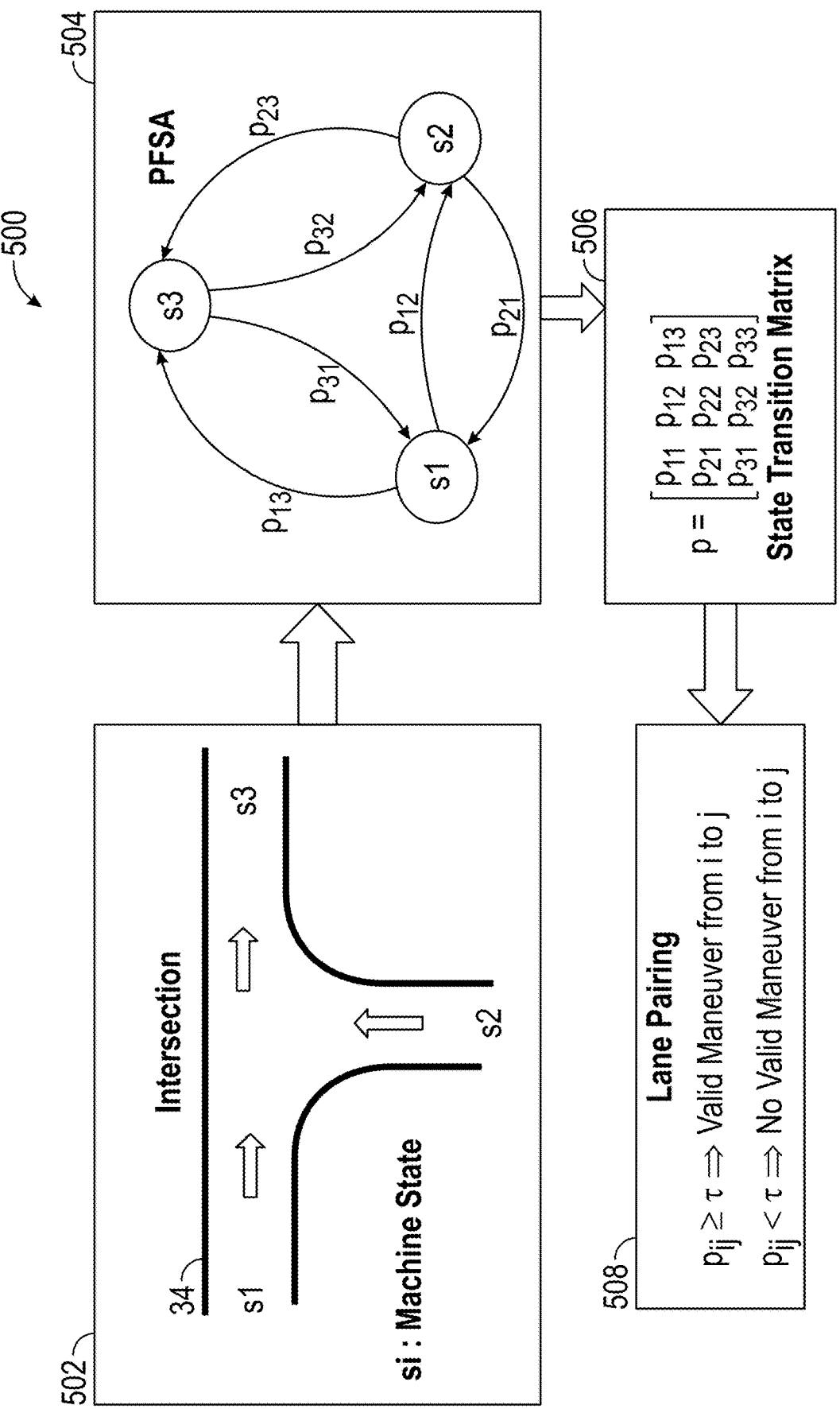
FIG. 6 is a method for constructing a PFSA for lane pairing, which is part of the method of FIG. 2.

FIG. 6 is a method 500 for constructing a PFSA for lane pairing. The PFSA may alternatively be referred to as a machine. The method 500 begins at block 502. At block 502, the controller 12 receives inputs, including the states of the vehicles 18 passing through the predetermined intersection 34. The state of the vehicles 18, which may be determined based on the telemetry data, may be referred to as the machine's state s1. As a non-limiting example, the machine's states s1 may include a first state s1, a second state s2, and a third state s3. However, there may be more or fewer machine states s1. In the depicted embodiment, the machine's states s1 represent the position of one of the vehicles 18 in the predetermined intersection 34. The method 500 then proceeds to block 504.

At block 504, the controller 12 constructs the PFSA based on the inputs received at block 502 (i.e., the machine's states s1). In the diagram depicted in block 504, the circles represent the machine's states s1 (e.g., the first state s1, the second state s2, and the third state s3), and the arrows represent the transitions pij from the machine state s1 to another state sj, wherein pij is the probability that state j will occur given that we are at state i. State i corresponds to a vehicle location at an inbound lane in the predetermined intersection 34, and state j corresponds to a vehicle location at an outbound lane at the predetermined intersection 34. In the present disclosure, the pij is equal to (number of vehicles transition from i to j)/(total number of vehicles leaving state i). In the depicted embodiment, the transitions pij include p11, p12, p13, p21, p22, p23, p31, p32, and p33. However, the PFSA may include more or fewer transitions pij. In this diagram, the transitions pij represent an input given to the vehicle 18 to transition from a first position (represented by machine's state s1) to a second position (represented by machine's state sj) at the predetermined intersection 34. Once the PFSA is constructed, the method 500 proceeds to block 506. At block 506, the PFSA outputs a state transition matrix with all the possible transitions. Then, the method 500 proceeds to block 508.

At block 508, the controller 12 uses the state transition matrix to determine whether the vehicle maneuver from state i to state j is valid. Here, the controller 12 determines whether the vehicle maneuver is valid if the value of pij is equal to or greater than a predetermined threshold τ. If the value of pij is equal to or greater than a predetermined threshold τ, then the pij corresponds to a valid vehicle maneuver from i to j. If the value of pij is less than the predetermined threshold τ, then the pij does not correspond to a valid vehicle maneuver. As such, lane pairing is performed. While the predetermined intersection 34 includes solely a few lanes, it is envisioned that the predetermined intersection 34 may include multiple lanes, and the same method 500 may be used for lane pairing multiple lanes. The method 500 has some constraints. The data inputs in this method 500 includes road and lane edges up to the predetermined intersection 34 and road network topology (RNT). The method 500 has some constraints. For a maneuver, the number of inbound lanes equals the number of outbound lanes for a one-to-one lane mapping in simple pairing. The method 500 may entail simple pairing or complex pairing. In simple pairing, the method 500 does not utilize maneuver partitioned telemetry data. In complex pairing, the method 500 utilizes maneuver partitioned telemetry data.

Figure 7:
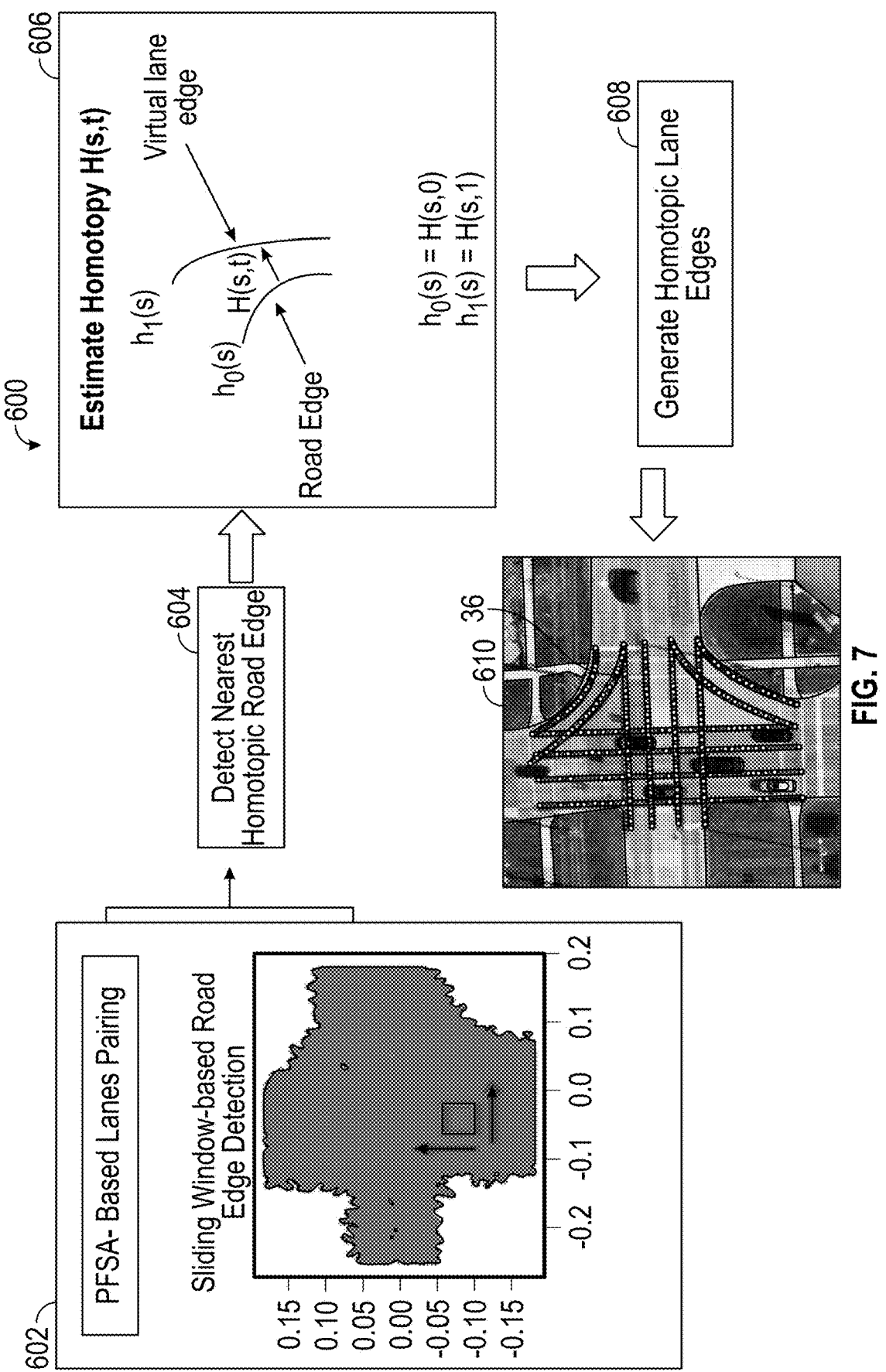
FIG. 7 is a flowchart of a method for lane edge detection using a homotopy model.

FIG. 7 is a flowchart of a method 600 for lane edge detection using a homotopy model. The method 600 begins at block 602. At block 602, the controller 12 receives inputs, such as the lane pairing determined using method 500. The method 600 proceeds to block 604. At block 604, the controller 12 employs a nearest neighbor analysis to detect the homotopic road edges 36. The method 600 then proceeds to block 606. At block 606, the controller 12 estimates a homotopy H(s,t). At block 606, $h_0(s)$ is a function describing the road edge 36, $h_1(s)$ is a function describing the lane edge, and H(s,t) is a continuous function such as H(s,0)=$h_0$(s) and H(s,1)=$h_1$(s). H(s,t) is run for each maneuver. Then, the method 600 proceeds to block 608. At block 608, the controller 12 generates a homotopic lane edges using the estimated homotopy H(s,t) for each maneuver. Then, the method 600 proceeds to block 610. At block 610, the controller 12 outputs a virtual map of the predetermined intersection 36 with the lane edges for all viable maneuvers.

Figure 8:
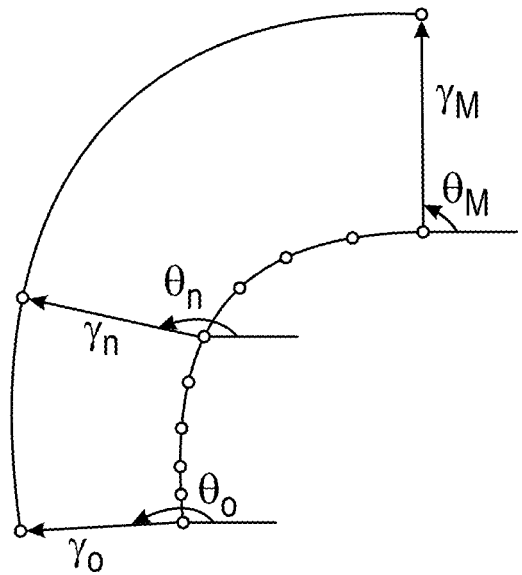
FIG. 8 is a schematic diagram for estimating the homotopy using linear interpolation.

With reference to FIG. 8, to estimate the homotopy H(s,t) using linear interpolation the controller 12 may employ the following equations:

$$r_n = \left(\frac{M-n}{M}\right)r_0 + \left(\frac{n}{M}\right)r_M; \text{ and}$$

$$\theta_n = \left(\frac{M-n}{M}\right)\theta_0 + \left(\frac{n}{M}\right)\theta_M$$

where: $r_n$ is a radial coordinate of the n-th lane edge point to be estimated and measured from the n-th road edge point;

$\theta_n$ is an angular coordinate of the n-th lane edge point to be estimated and measured from the n-th road edge point;

M is the number of road edge points; and n is an integer between 0 and M, i.e., 0≤n≤M.

Figure 9:
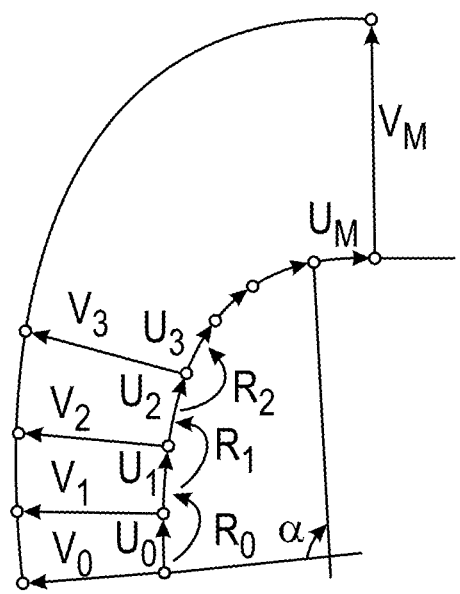
FIG. 9 is a schematic diagram for estimating the homotopy using vector rotations.

With reference to FIG. 9, to estimate the homotopy H(s,t) using vector rotations, the controller 12 may employ the following equations:

$$U_{n+1} = R_n U_n \rightarrow R_n$$

$$e_{n+1} = R_n e_n, e_0 = \frac{V_0}{\|V_0\|}$$

$$U_M = R(\alpha)U_0 \rightarrow \alpha$$

$$U_{n+1} = R_n(\theta_n)U_n \rightarrow \theta_n$$

$$\|V_n\| = \|V_0\|\frac{\alpha - \theta_n}{\alpha} + \|V_M\|\frac{\theta_n}{\alpha}$$

$$V_n = \|V_n\|e_n$$

Where:

$U_n$ is a vector between two consecutive road edge points;

$R_n$ is a rotation matrix;
$V_n$ is a vector between a road edge point and a lane edge point to be estimated;
α is an angle between $V_0$ and $V_{M-1}$;
M is the number of road edge points;
n is an integer between 0 and M, i.e., 0≤n≤M;
$e_n$ is a unit vector along $V_n$; and
$\|.\|$ is an Euclidean norm.

The detailed description and the drawings or figures are a supportive description of the present teachings, but the scope of the present teachings is defined solely by the claims. While some of the best modes and other embodiments for carrying out the present teachings have been described in detail, various alternative designs and embodiments exist for practicing the present teachings defined in the appended claims.

What is claimed is:

1. A method for detecting road edges at a predetermined intersection, comprising:
    receiving, by a controller, aerial imagery data about the predetermined intersection;
    receiving, by the controller, vehicle telemetry data gathered within a predetermined radius around the predetermined intersection from a plurality of vehicles passing through the predetermined intersection, wherein the vehicle telemetry data includes a plurality of telemetry data points;
    detecting, using the aerial imagery data and generative adversarial networks (GANs) executed on the controller, road edges at the predetermined intersection;
    classifying, using a random forest classifier (RFC), the predetermined intersection with each telemetry data point labeled with a corresponding unique maneuver to create a maneuver-labeled telemetry data points at the predetermined intersection;
    constructing, using the maneuver-labeled telemetry data points determined by the RFC and the road edges, a probabilistic finite state automata (PFSA) to pair inbound lanes with outbound lanes at the predetermined intersection; and
    determining lane edges at the predetermined intersection using a homotopy model.

2. The method of claim 1, further comprising determining whether the road edges detected using the GANs are accurate.

3. The method of claim 2, wherein the road edges detected using the GANs are imagery-based road edges, and the method further comprises determining, using the vehicle telemetry data and a sliding window-based model executed on the controller, telemetry-based road edges at the predetermined intersection in response to determining that the imagery-based road edges detected using the GANs are not accurate.

4. The method of claim 3, wherein the homotopy model uses a nearest neighbor analysis to detect the road edges to be mimicked for generating lane edges for a specific maneuver via closed-form formulas that estimate homotopy between the detected road edge and the generated lane edges.

5. The method of claim 4, wherein the vehicle telemetry data is gathered by at least one sensor within the predetermined radius around the predetermined intersection and the vehicle telemetry data is map-matched with an existing street graph.

6. The method of claim 5, wherein the homotopy model uses linear interpolation to determine the lane edges at the predetermined intersection.

7. The method of claim 5, wherein the homotopy model uses vector rotation to detect the lane edges at the predetermined intersection.

8. The method of claim 3, further comprising gathering the vehicle telemetry data from at least one sensor of the plurality of vehicles passing through the predetermined intersection.

9. The method of claim 8, further comprising training the RFC using path-labeled datapoints.

10. The method of claim 2, further comprising autonomously controlling a host vehicle using the lane edges detected by the homotopy model.

11. The method of claim 10, further comprising identifying allowable maneuvers using the vehicle telemetry data and label datapoints of the vehicle telemetry data corresponding to the allowable maneuvers as path-labeled data points.

12. The method of claim 1, further comprising controlling a host vehicle such that the host vehicle stays within the lane edges while traveling through the predetermined intersection.

13. A control system for detecting road edges at a predetermined intersection, comprising:
    a controller programmed to:
        receive aerial imagery data about the predetermined intersection;
        receive vehicle telemetry data gathered within a predetermined radius around the predetermined intersection from a plurality of vehicles passing through the predetermined intersection, wherein the vehicle telemetry data includes a plurality of telemetry data points;
        detect, using the aerial imagery data and generative adversarial networks (GANs), road edges at the predetermined intersection;
        classify, using a random forest classifier (RFC), the predetermined intersection with each telemetry data point labeled with a corresponding unique maneuver to create a maneuver-labeled telemetry data points at the predetermined intersection;
        construct, using the maneuver-labeled telemetry data points determined by the RFC and the road edges, a probabilistic finite state automata (PFSA) to pair inbound lanes with outbound lanes at the predetermined intersection; and
        determine lane edges at the predetermined intersection using a homotopy model.

14. The control system of claim 13, wherein the controller is further programmed to determine whether the road edges detected using the GANs are accurate.

15. The control system of claim 14, wherein the road edges detected using the GANs are imagery-based road edges, and the controller is further programmed to determine, using the vehicle telemetry data and a sliding window-based model executed on the controller, telemetry-based road edges at the predetermined intersection in response to determining that the imagery-based road edges detected using the GANs are not accurate.

16. The control system of claim 15, wherein the homotopy model uses a nearest neighbor analysis to detect a road edge to be mimicked for generating lane edges for a specific maneuver via closed-form formulas that estimate homotopy between the detected road edge and the generated lane edges.

17. The control system of claim 16, wherein the controller is programmed to autonomously control a host vehicle using the lane edges detected by the homotopy model.

18. The control system of claim 17, wherein the controller is programmed to gather the vehicle telemetry data from at least one sensor of the plurality of vehicles passing through the predetermined intersection.

19. The control system of claim 18, wherein the vehicle telemetry data is gathered by the at least one sensor within the predetermined radius around the predetermined intersection and the vehicle telemetry data is map-matched with an existing street graph.

20. The control system of claim 19, wherein the controller is further programmed to identify allowable maneuvers using the vehicle telemetry data and label datapoints of the vehicle telemetry data corresponding to the allowable maneuvers as path-labeled data points.

\* \* \* \* \*